US006745284B1

(12) United States Patent
Lee et al.

(10) Patent No.: US 6,745,284 B1
(45) Date of Patent: Jun. 1, 2004

(54) DATA STORAGE SUBSYSTEM INCLUDING A STORAGE DISK ARRAY EMPLOYING DYNAMIC DATA STRIPING

(75) Inventors: Whay S. Lee, Newark, CA (US); Randall D. Rettberg, Danville, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 442 days.

(21) Appl. No.: 09/678,466

(22) Filed: Oct. 2, 2000

(51) Int. Cl.[7] .............................................. G06F 12/00
(52) U.S. Cl. ..................... 711/114; 711/161; 711/162; 711/112; 711/170; 711/165; 711/205; 711/206; 711/207; 711/208; 711/202; 711/220; 714/6
(58) Field of Search ................................ 711/114, 113, 711/165, 170, 4, 207, 208, 202, 220, 112, 111, 161, 162, 205, 206; 714/6

(56) References Cited

U.S. PATENT DOCUMENTS

| | | | |
|---|---|---|---|
| 5,124,987 A | | 6/1992 | Milligan et al. |
| 5,502,836 A | * | 3/1996 | Hale et al. ................... 711/170 |
| 5,537,567 A | * | 7/1996 | Galbraith et al. ........... 711/114 |
| 5,596,736 A | * | 1/1997 | Kerns ............................. 711/4 |
| 5,644,697 A | * | 7/1997 | Matsumoto et al. ........... 714/6 |
| 5,754,756 A | * | 5/1998 | Watanabe et al. .............. 714/6 |
| 5,802,344 A | * | 9/1998 | Menon et al. ............... 711/165 |
| 5,933,834 A | * | 8/1999 | Aichelen ................ 707/103 R |
| 6,334,168 B1 | * | 12/2001 | Islam et al. ................. 711/113 |
| 6,425,052 B1 | * | 7/2002 | Hashemi ..................... 711/114 |
| 6,473,830 B2 | * | 10/2002 | Li et al. ..................... 711/112 |
| 6,513,093 B1 | * | 1/2003 | Chen et al. .................... 711/4 |

FOREIGN PATENT DOCUMENTS

| | | | |
|---|---|---|---|
| EP | 1197836 | * 4/2002 | ............. G06F/3/06 |
| WO | 93/13475 | 7/1993 | |

OTHER PUBLICATIONS

Menon, et al., "Floating Parity and Data Disk Array," Journal of Parallel and Distributed Computing 17, pp. 129–139, 1993.
Patterson, et al., "A Case for Redundant Arrays of Inexpensive Disks (RAID)," Proceedings of the International Conference on Management of Data (SIGMOD), Jun. 1998.
Mogi, et al., "Hot Block Clustering for Disk Arrays with Dynamic Striping," Proceedings of the 21st VLDB Conference, Zurich, Switzerland, 1995, pp. 90–99.
Gabber, et al., "Data Logging: A Method for Efficient Data Updates in Constantly Active RAIDs," Proc. Of t.he 14th ICDE, pp. 144–153, Feb. 1998.

(List continued on next page.)

Primary Examiner—Matthew Kim
Assistant Examiner—Zhuo H. Li
(74) Attorney, Agent, or Firm—Robert C. Kowert; Meyertons, Hood, Kivlin, Kowert & Goetzel, P.C.

(57) ABSTRACT

A data storage subsystem including a storage disk array employing dynamic data striping. A data storage subsystem includes a plurality of storage devices configured in an array and a storage controller coupled to the storage devices. The storage controller is configured to store a first stripe of data as a plurality of data stripe units across the plurality of storage devices. The plurality of data stripe units includes a plurality of data blocks and a parity block which is calculated for the plurality of data blocks. The storage controller is further configured to store a second stripe of data as a plurality of data stripe units across the storage devices. The second plurality of data stripe units includes another plurality of data blocks, which is different in number than the first plurality of data blocks, and a second parity block calculated for the second plurality of data blocks. Furthermore, the second plurality of data blocks may be a modified subset of the first plurality of data blocks. The storage controller is also configured to store the second plurality of data blocks and the second parity block to new locations.

42 Claims, 8 Drawing Sheets

OTHER PUBLICATIONS

Mogi, et al., "Dynamic Parity Stripe Reorganizations for RAIDs Disk Arrays," Institute of Industrial Science, The University of Tokyo, IEEE, 1994, XP-002126185, pp. 17–26.

Menon, et al., "Methods for Improved Update Performance of Disk Arrays," IBM Almaden Research Center, IEEE, 1992, pp. 74–83.

Jin, et al., "Improving Partial Stripe Write Performance in RAID Level 5," Dept. of Computer Science and Engineering, IEEE, 1998, pp. 396–400.

Mogi, et al., "Virtual Striping: A Storage Management Scheme with Dynamic Striping," Special Issue on Architectures, Algorithms and Networks for Massively Parallel Computing, IEICE Trans Inf. & Syst., vol. E9 D, No. 8, Aug. 1996, 7 pages.

International Search Report for PCT/US 01/29653 mailed Mar. 21, 2003, 7 pages.

* cited by examiner

Free Segment Bitmap

| | Drive 0 | Drive 1 | Drive 2 | Drive 3 |
|---|---|---|---|---|
| | 10100 | 10011 | 10001 | 10110 |
| | 10011 | 11000 | 11100 | 10000 |
| | 11001 | 11001 | 11100 | 10101 |
| | ... | ... | ... | ... |
| Disk Head Offset | -2 | 3 | -1 | 0 |

Current Head Position ——>>

FIG. 6A

Block Remapping Table

Hashed Indirection Table

| Logical Address | PGT Index |
|---|---|
| 0 | 12 |
| 1 | 13 |
| 2 | 27 |
| 3 | 28 |
| 4 | 29 |
| 5 | |
| ... | ... |
| 14 | |
| 15 | |
| 16 | |
| ... | |

FIG. 6B

Block Remapping Table

Parity Group Table

| PGT Entry | Valid | Segment | Next Entry In Parity Group | Data/Parity |
|---|---|---|---|---|
| 0 | N | | | |
| ... | | ... | | |
| 12 | Y | D1.132 | 13 | D |
| 13 | Y | D2.542 | 27 | D |
| ... | | ... | | |
| 26 | N | | | |
| 27 | Y | D3.104 | 28 | D |
| 28 | Y | D4.210 | 29 | D |
| 29 | Y | D5.070 | 12 | P |
| ... | | | | |

FIG. 6C

Block Remapping Table

Hashed Indirection Table

| Logical Address | PGT Index |
|---|---|
| 0 | 14 |
| 1 | 15 |
| 2 | 27 |
| 3 | 28 |
| 4 | 29 |
| 5 | 16 |
| ... | ... |
| 14 | ... |
| 15 | ... |
| 16 | ... |
| ... | ... |

FIG. 7A

Block Remapping Table

Parity Group Table

| PGT Entry | Valid | Segment | Next Entry In Parity Group | Data/Parity |
|---|---|---|---|---|
| 0 | N | ... | | |
| ... | | | | |
| 12 | Y | D1.132 | 13 | D |
| 13 | Y | D2.542 | 27 | D |
| 14 | Y | D1.565 | 15 | D |
| 15 | Y | D2.278 | 16 | D |
| 16 | Y | D3.137 | 14 | P |
| ... | | | | |
| 26 | N | | | |
| 27 | Y | D3.104 | 28 | D |
| 28 | Y | D4.210 | 29 | D |
| 29 | Y | D5.070 | 12 | P |
| ... | | | | |

FIG. 7B

Block Remapping Table

Parity Group Table

| PGT Entry | Valid | Segment | Next Entry In Parity Group | Data/Parity |
|---|---|---|---|---|
| 0 | N | ... | | |
| 1 | Y | D2.354 | 2 | D |
| 2 | Y | D3.231 | 3 | D |
| 3 | Y | D4.134 | 1 | P |
| 4 | N | | | |
| ... | | | | |
| 12 | Y | D1.132 | 13 | D |
| 13 | Y | D2.542 | 27 | D |
| 14 | Y | D1.565 | 15 | D |
| 15 | Y | D2.278 | 16 | D |
| 16 | Y | D3.137 | 17 | D |
| 17 | Y | D4.243 | 14 | P |
| ... | | | | |
| 26 | N | | | |
| 27 | Y | D3.104 | 28 | D |
| 28 | Y | D4.210 | 29 | D |
| 29 | Y | D5.070 | 12 | P |
| ... | | | | |

FIG. 8B

Block Remapping Table

Hashed Indirection Table

| Logical Address | PGT Index N Version | | |
|---|---|---|---|
| | Ver. 0 | Ver. 1 | Ver. 2 |
| 0 | 14 | 12 | ... |
| 1 | 1 | 15 | 13 |
| 2 | 2 | 16 | 27 |
| 3 | 28 | ... | ... |
| 4 | 29 | ... | ... |
| 5 | 17 | ... | ... |
| ... | | | |
| 14 | 3 | ... | ... |
| 15 | ... | ... | ... |
| 16 | ... | ... | ... |
| ... | | | |

FIG. 8A

DATA STORAGE SUBSYSTEM INCLUDING A STORAGE DISK ARRAY EMPLOYING DYNAMIC DATA STRIPING

BACKGROUND OF THE INVENTION

1. Field of the Invention

This invention relates to computer data storage systems, and more particularly, to Redundant Array of Inexpensive Disks (RAID) systems and data striping techniques.

2. Description of the Related Art

A continuing desire exists in the computer industry to consistently improve the performance of computer systems over time. For the most part, this desire has been achieved for the processing or microprocessor components of computer systems. Microprocessor performance has steadily improved over the years. However, the performance of the microprocessor or processors in a computer system is only one component of the overall performance of the computer system. For example, the computer memory system must be able to keep up with the demands of the processor or the processor will become stalled waiting for data from the memory system. Generally computer memory systems have been able to keep up with processor performance through increased capacities, lower access times, new memory architectures, caching, interleaving and other techniques.

Another critical component to the overall performance of a computer system is the I/O system performance. For most applications the performance of the mass storage system or disk storage system is the critical performance component of a computer's I/O system. For example, when an application requires access to more data or information than it has room in allocated system memory, the data may be paged in/out of disk storage to/from the system memory. Typically the computer system's operating system copies a certain number of pages from the disk storage system to main memory. When a program needs a page that is not in main memory, the operating system copies the required page into main memory and copies another page back to the disk system. Processing may be stalled while the program is waiting for the page to be copied. If storage system performance does not keep pace with performance gains in other components of a computer system, then delays in storage system accesses may overshadow performance gains elsewhere.

One method that has been employed to increase the capacity and performance of disk storage systems is to employ an array of storage devices. An example of such an array of storage devices is a Redundant Array of Independent (or Inexpensive) Disks (RAID). A RAID system improves storage performance by providing parallel data paths to read and write information over an array of disks. By reading and writing multiple disks simultaneously, the storage system performance may be greatly improved. For example, an array of four disks that can be read and written simultaneously may provide a data rate almost four times that of a single disk. However, using arrays of multiple disks comes with the disadvantage of increasing failure rates. In the example of a four disk array above, the mean time between failure (MTBF) for the array will be one-fourth that of a single disk. It is not uncommon for storage device arrays to include many more than four disks, shortening the mean time between failure from years to months or even weeks. RAID systems address this reliability issue by employing parity or redundancy so that data lost from a device failure may be recovered.

One common RAID technique or algorithm is referred to as RAID 0. RAID 0 is an example of a RAID algorithm used to improve performance by attempting to balance the storage system load over as many of the disks as possible. RAID 0 implements a striped disk array in which data is broken down into blocks and each block is written to a separate disk drive. Thus, this technique may be referred to as striping. Typically, I/O performance is improved by spreading the I/O load across multiple drives since blocks of data will not be concentrated on any one particular drive. However, a disadvantage of RAID 0 systems is that they do not provide for any data redundancy and are thus not fault tolerant.

Figure 1:
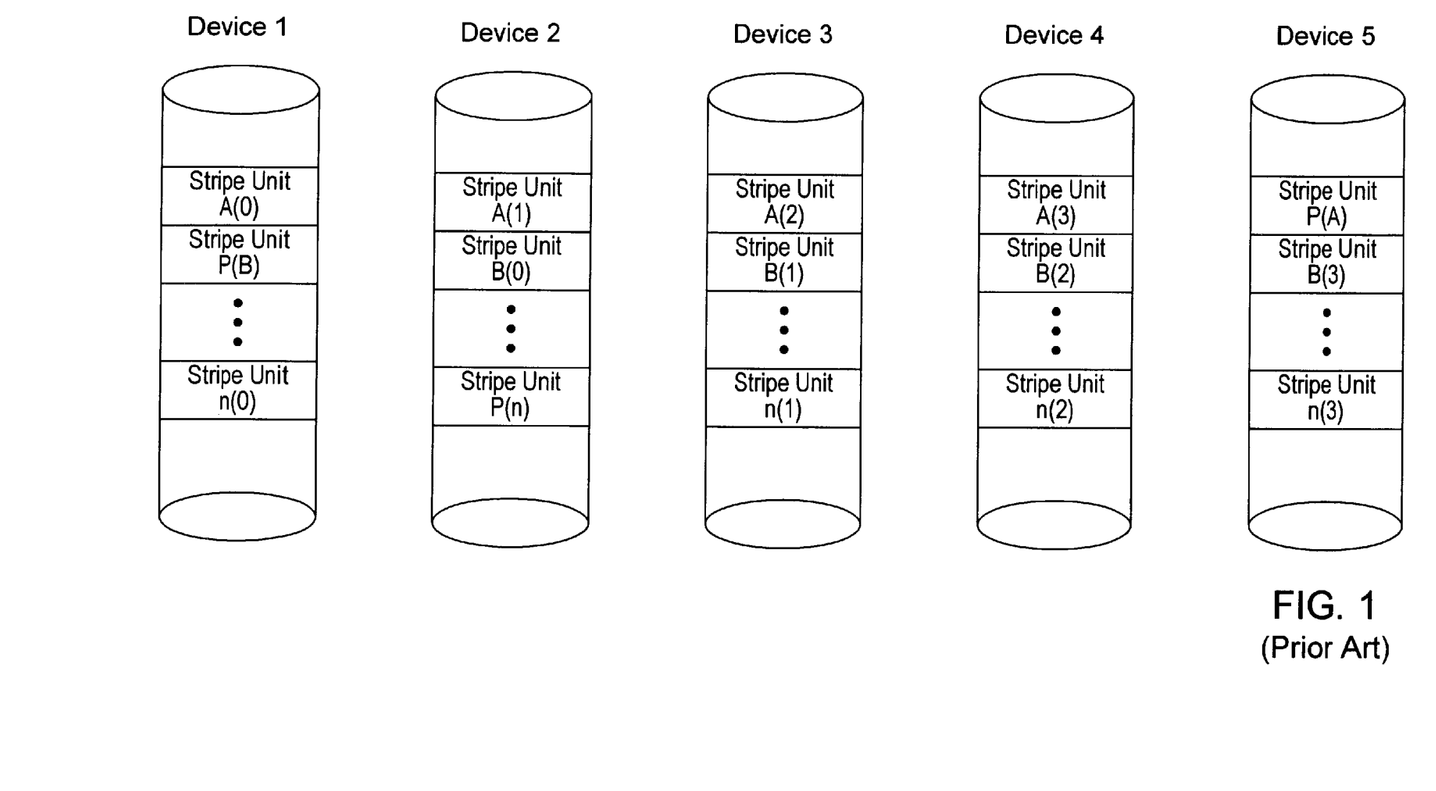
FIG. 1 is a diagram of one embodiment of a conventional RAID 5 storage arrangement.

RAID 5 is an example of a RAID algorithm that provides some fault tolerance and load balancing. FIG. 1 illustrates a RAID 5 system, in which both data and parity information are striped across the storage device array. In a RAID 5 system, the parity information is computed over fixed size and fixed location stripes of data that span all the disks of the array. Together, each such stripe of data and its parity block form a fixed size, fixed location parity group. When a subset of the data blocks within a parity group is updated, the parity must also be updated. The parity may be updated in either of two ways. The parity may be updated by reading the remaining unchanged data blocks and computing a new parity in conjunction with the new blocks, or reading the old version of the changed data blocks, comparing them with the new data blocks, and applying the difference to the parity. However, in either case, the additional read and write operations can limit performance. This limitation is known as a small-write penalty problem. RAID 5 systems can withstand a single device failure by using the parity information to rebuild a failed disk.

Additionally, a further enhancement to the several levels of RAID architecture is a an algorithm known as write-anywhere. As noted above in the RAID 5 system, once the data striping is performed, that data stays in the same fixed, physical location on the disks. Thus, the parity information as well as the data is read from and written to the same place. In systems that employ the write-anywhere algorithm, when an update occurs, the parity information is not computed immediately for the new data. The new data is cached and the system reads the unmodified data. The unmodified data and the new data are merged, the new parity is calculated and the new data and parity are written to new locations on the disks within the array group. One system that employs a write-anywhere algorithm is the Iceberg™ system from the Storage Technology Corporation. The write-anywhere technique reduces efficiency overhead associated with head seek and disk rotational latencies caused by having to wait for the head to get to the location of the data and parity stripes on the disks in the arrays.

Although the write-anywhere technique removes the efficiency overhead mentioned above, it is desirable to make further improvements to the system efficiency.

SUMMARY OF THE INVENTION

The problems outlined above may in large part be solved by a data storage subsystem including a storage disk array employing dynamic data striping.

In one embodiment, a data storage subsystem includes a plurality of storage devices configured in an array and a storage controller coupled to the storage devices. The storage controller is configured to store a first stripe of data as a plurality of data stripe units across the plurality of storage devices. The plurality of data stripe units includes a plurality of data blocks and a parity block which is calculated for the plurality of data blocks. The storage controller is further configured to store a second stripe of data as a plurality of data stripe units across the storage devices. The second plurality of data stripe units includes another plurality of data blocks, which is different in number than the first plurality of data blocks, and a second parity block calculated for the second plurality of data blocks. Furthermore, the second plurality of data blocks may be a modified subset of the first plurality of data blocks. The storage controller is also configured to store the second plurality of data blocks and the second parity block to new locations.

In various additional embodiments, the storage controller may be configured to keep track of the storage locations and parity group membership. For example, a free segment bitmap may be maintained, which is a listing of the physical segments of the storage devices. The bitmap may include indications of whether the physical segments contain data or not and a pointer indicating where a disk head is currently located. Additionally, a block remapping table consisting of a hashed indirection table and a parity group table may be maintained. The block remapping table maps entries representing logical data blocks to physical segments. The table also maps the membership of the various segments to their respective parity groups.

In another embodiment, the storage controller is configured to realign parity groups by collecting the existing parity groups, which may be of different sizes, and forming new parity groups which are uniformly sized according to a default size. The storage controller calculates new parity blocks for each new parity group and subsequently stores both the new parity groups and the new parity blocks to new locations. Additionally, the storage controller may be further configured to maintain older versions of the existing parity groups.

The data storage subsystem may advantageously improve overall storage system efficiency by calculating a new parity block for the new data and writing just the new data and new parity block to new locations, thereby eliminating the need to read existing data blocks in a parity group prior to modifying any data blocks in the parity group.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
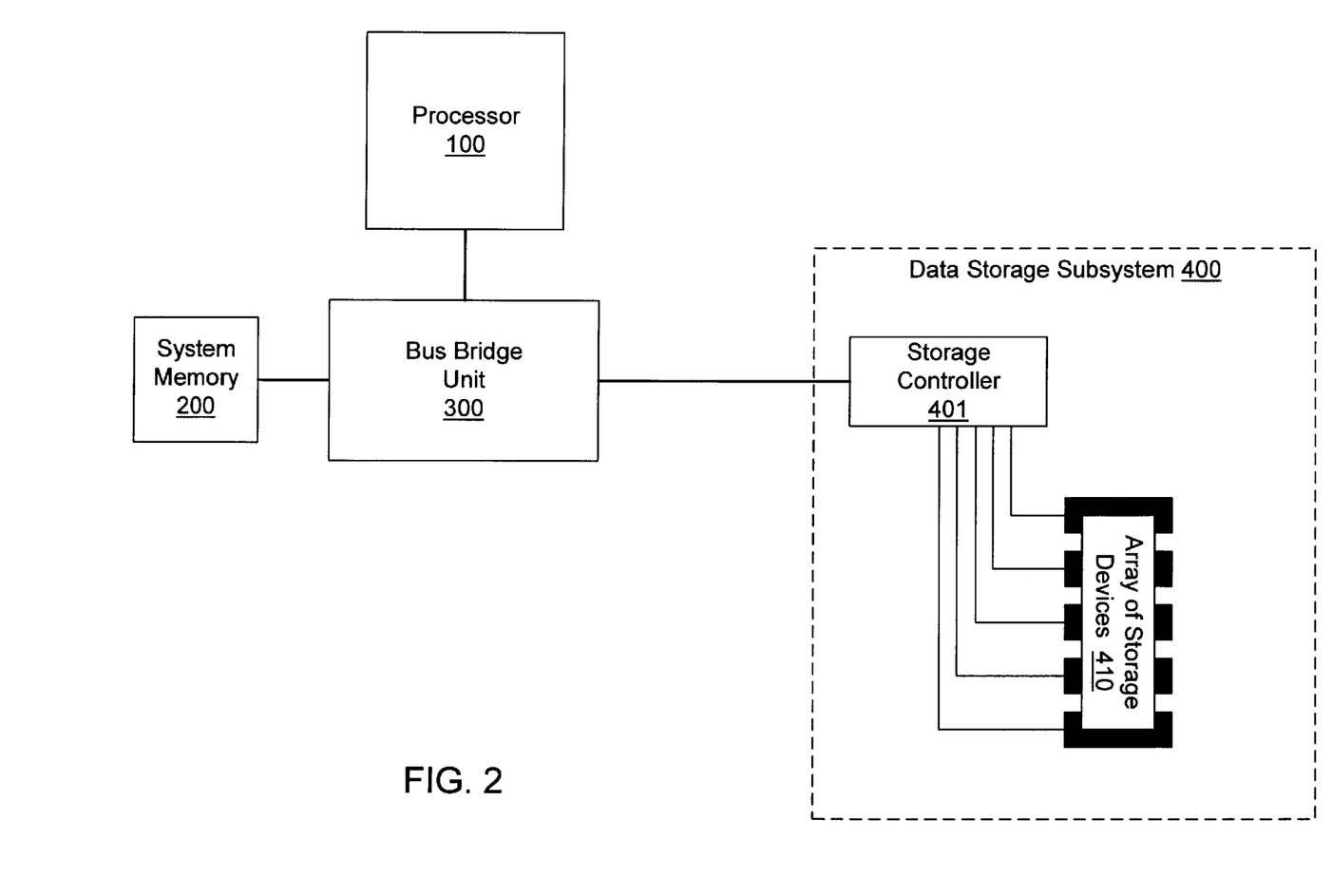
FIG. 2 is a block diagram of one embodiment of a computer system including a data storage subsystem.

Refer now to FIG. 2, a block diagram of one embodiment of a computer system including a data storage subsystem. The computer system includes a main processor 100 coupled to a bus bridge unit 300. Bus bridge unit 300 is coupled to a system memory 200 and to a data storage subsystem 400. System memory 200 may be used by processor 100 to temporarily store data and software instructions which must be accessed rapidly during system operation. Bus bridge 300 may contain hardware to control system memory 200 and data storage subsystem 400. As will be described further below, data storage subsystem 400 includes an array of storage devices which may also store data and software instructions.

Figure 3:
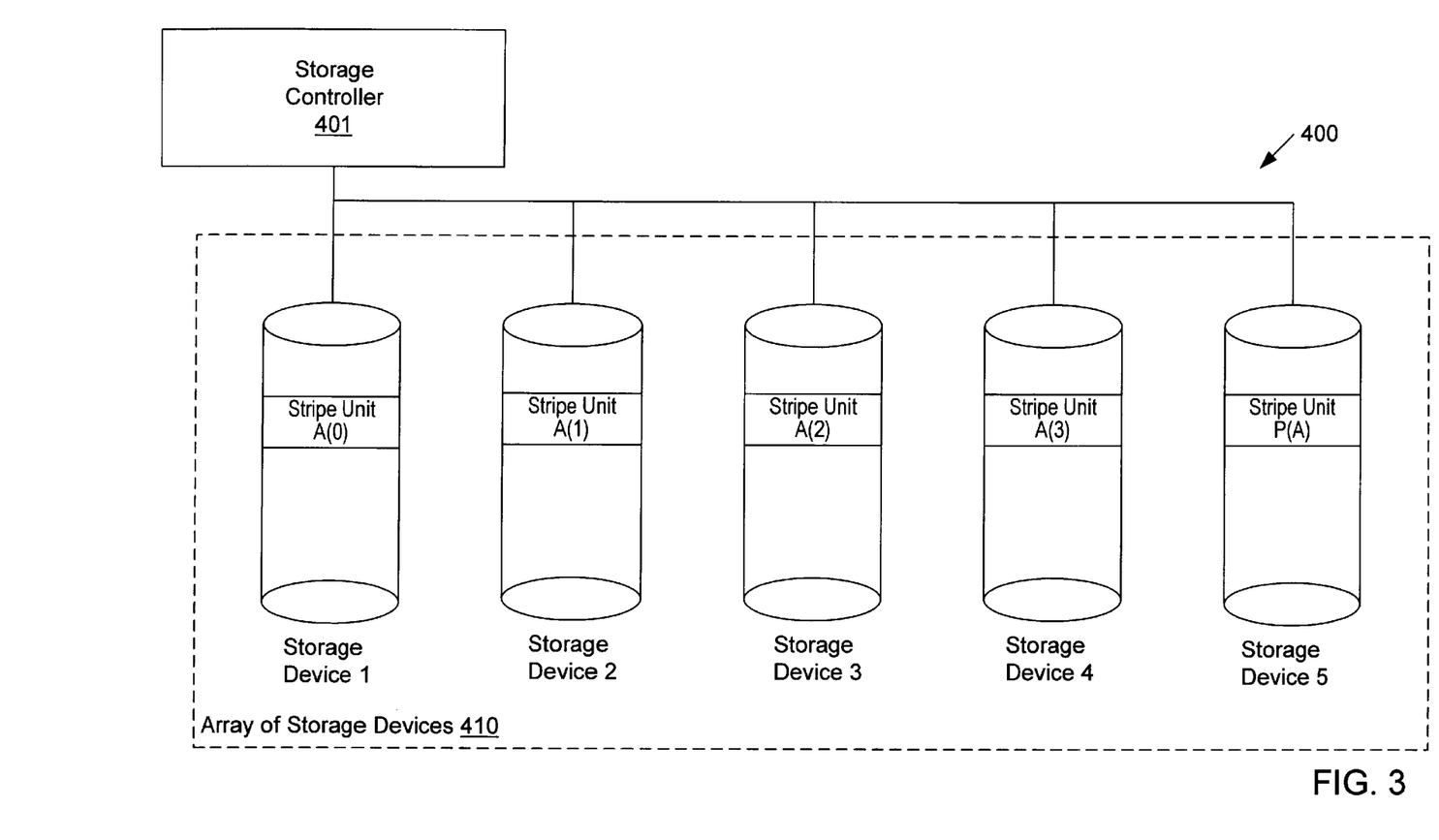
FIG. 3 is one embodiment of a data storage subsystem.

Turning now to FIG. 3, one embodiment of a data storage subsystem is shown. Circuit components that correspond to those shown in FIG. 2 are numbered identically for simplicity and clarity. The data storage subsystem 400 of FIG. 2 includes a storage controller 401 coupled to an array of storage devices 410. In this embodiment, array of storage devices 410 includes five storage devices shown as storage device 1 through storage device 5. When processor 100 of FIG. 2 writes data to data storage subsystem 400, storage controller 401 of FIG. 3 is configured to separate the data into blocks and distribute the blocks across array of storage devices 410 in the manner shown in FIG. 1 and described in the description of a RAID 5 system in the background section. A parity block P(A) is computed for the 'A' data blocks and the result of the data write is shown in FIG. 3. The data has been divided into four data blocks, A(0) through A(3) and stored on storage devices 1 through 4, respectively. Parity block P(A) is stored in storage device 5. As will be described in more detail below in FIG. 4, if more data is to be stored, storage controller 401 again distributes the data blocks across array of storage devices 410.

Figure 4:
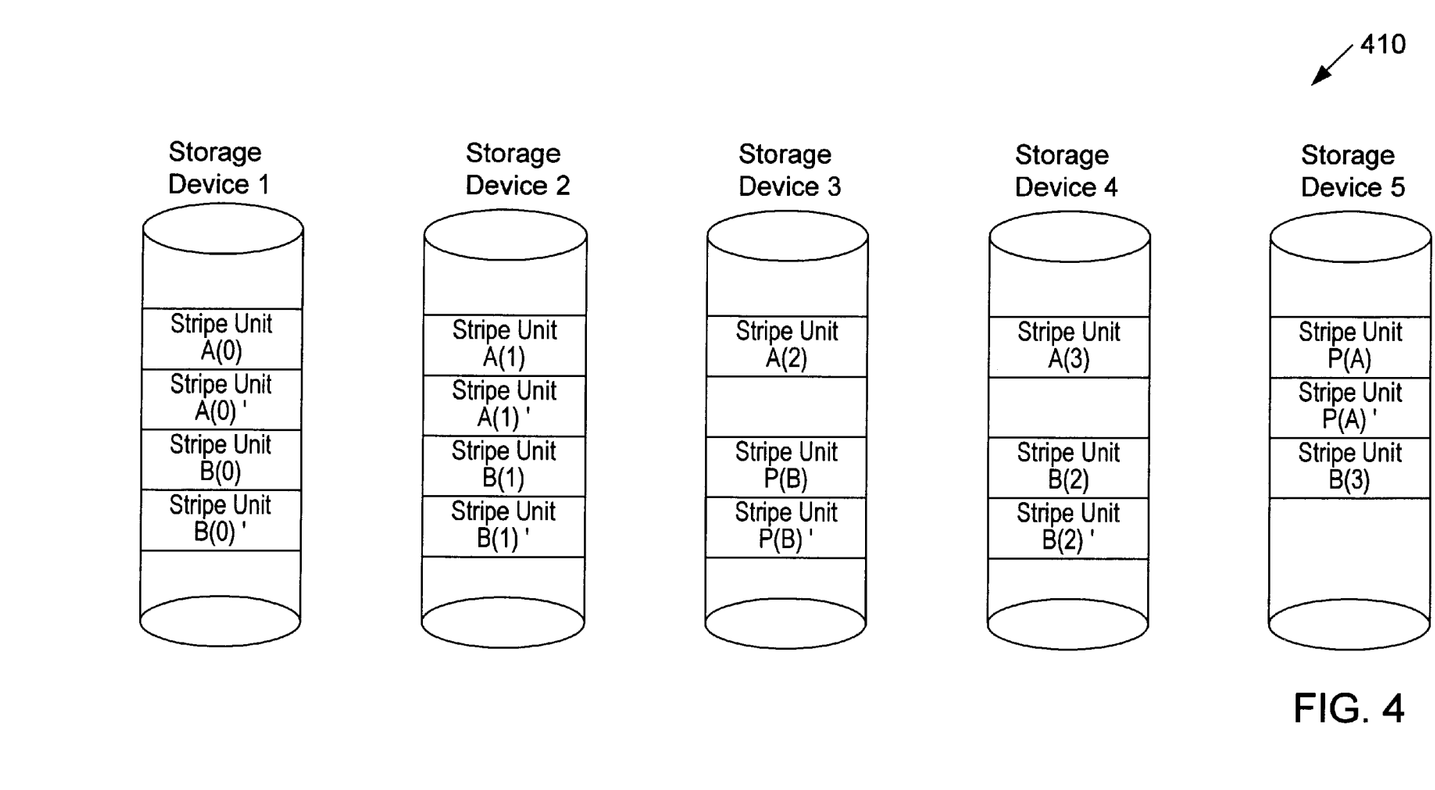
FIG. 4 is an embodiment of an array of storage devices employing dynamic data striping.

Referring now to FIG. 4, an embodiment of an array of storage devices employing dynamic data striping is illustrated. Circuit components that correspond to those shown in FIG. 3 are numbered identically for simplicity and clarity. In the array of FIG. 4, data and parity are striped across the storage devices 1 through 5. The data stripe corresponding to data and parity blocks for the A data blocks are the same as that shown in FIG. 3. When processor 100 of FIG. 1 writes new data to array of storage devices 410 of FIG. 4, the data is again striped across the storage devices. In this example, data stripe 'B' represents new data written to array of storage devices 410. The data is broken into four blocks, B(0) through B(3) and a parity block P(B) is calculated. The data blocks B(0) through B(3) and P(B) are stored across the storage devices such that the data and parity blocks are not stored on the same storage device.

When data in data stripe 'A' requires modification, only the data blocks which require modification and a new parity block are written. In this example, data blocks A(0) and A(1)

are modified and A(0)' and A(1)' represent the modified data. Storage controller 401 of FIG. 3 calculates a new parity block P(A)'. Data blocks A(0)', A(1)' and parity block P(A)' form a new parity group which has fewer data blocks than the original parity group formed by A(0) through A(3) and P(A). The new parity group is stored to new locations in storage devices 1, 2 and 5. Similarly, if data in data stripe 'B' requires modification, the data blocks which require modification and a new parity block are written. In this example, data blocks B(0), B(1) and B(2) are modified and B(0)', B(1)' and B(2)' represent the modified data. Parity block P(B)' represents the new parity block for the new parity group formed by B(0)', B(1)' and B(2)'. This new parity group also contains a different number of blocks than the original parity group formed by B(0) through B(3) and P(B). The parity block P(B)' and the new parity group are stored to new locations in storage devices 1 through 4. To reconstruct data in the event of a device failure, it may be a requirement of the system to store the blocks of new data that comprise a data stripe to locations on different devices. Thus, in one embodiment the only restriction on where blocks are stored is that no two blocks from the same parity group should be stored on the same storage device. However, to reduce the overhead associated with data copying between devices, e.g. during garbage collection, it may be useful to write each modified data block to the same device that the corresponding original data block was on. Alternatively, the modified data block may be stored to a device that contains no blocks from original data stripe.

Figure 5A:
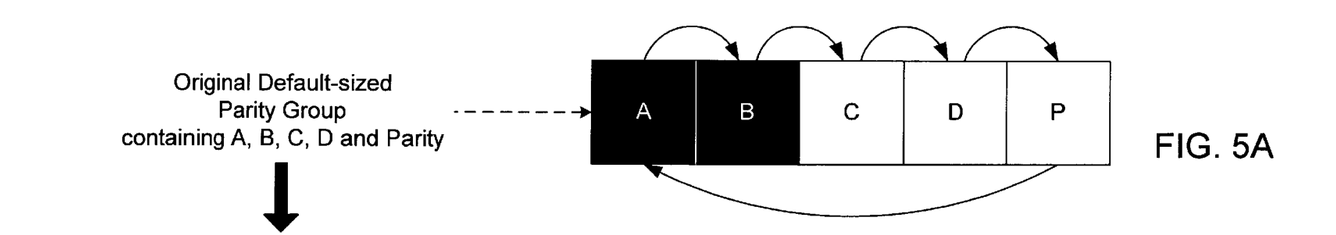
FIGS. 5A, 5B and 5C, are drawings depicting the operation of the storage controller of FIG. 3, according to an embodiment.
Figure 5B:
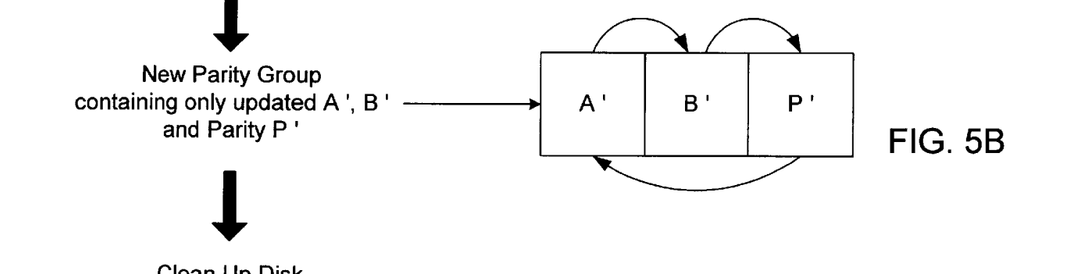
Figure 5C:
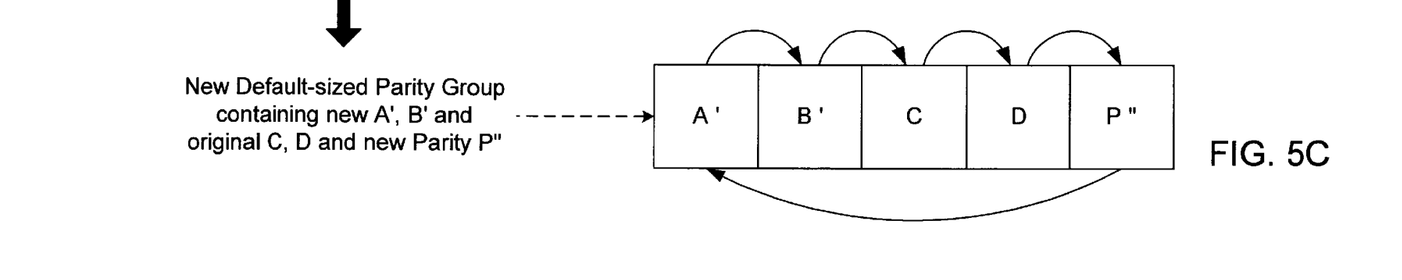

Turning collectively to FIGS. 5A, 5B and 5C, drawings depicting the operation of an embodiment of storage controller 401 of FIG. 3 are shown. In particular, this example shows, using FIGS. 5A and 5B, how a new parity group is formed from an existing parity group when some of the data blocks of FIG. 5A require modification. Additionally, FIG. 5C, illustrates an embodiment of how storage controller 401 of FIG. 3 may periodically realign non-uniformly sized parity groups into default sized parity groups.

FIG. 5A shows a parity group consisting of data blocks A, B, C, D and parity block P. Blocks A and B are shaded to indicate that those data blocks require modification. FIG. 5B illustrates the modified data blocks A' and B'. As described above in FIG. 4 a new parity block P' is calculated, but it is calculated only for A' and B' in FIG. 5B. Thus, a new parity group is formed containing only A', B' and P'. The older version of A and B data blocks still exist in the storage devices since the new data blocks are stored to new locations. Also, blocks C and D are still protected after the new parity group of A', B' and P' is formed since the original parity group still exists on the drives. Since calculating parity requires at least two pieces of data, in a case where only a single block of data requires modification, the parity information is merely a mirrored image of the data block itself.

As new parity groups are stored to new locations, the storage devices may begin to run out of free segments to store new parity groups. To manage this, the storage controller 401 of FIG. 3, may be configured to collect different sized parity groups and combine them into default sized parity groups. The collection and combining operations are sometimes referred to as garbage collection. Storage controller 401 may perform these garbage collection operations either when the system is idle, when the number of free segments falls below a predetermined number, or periodically. New parity blocks are calculated and the new default-sized parity groups are then stored to new locations, thereby effectively freeing up segments on the storage devices. In FIG. 5C, a new parity group is shown. The new parity group comprises A', B', C, D and a new parity block P'', which is calculated over only those data blocks in the new parity group. The new default-sized parity group is then stored to a new location. As will be described further below, the parity blocks are calculated using an exclusive OR of the data in the blocks being protected. After the new parity group of A', B', C, D and P'' is formed, the old versions A, B, P and P' are no longer needed (since all the latest versions A', B', C, and D are now protected by P''), and their space may be reclaimed.

Alternatively, in a file system which maintains older versions of data, the original version of the default-sized parity group shown in FIG. 5A may be maintained on the storage devices to accommodate retrieval by a system user at a later time. The older versions are sometimes referred to as generational images. Generational images are described in more detail below.

In order for storage controller 401 of FIG. 3 to keep track of where the data is stored and what relationship one piece of data has to another piece of data, storage controller 401 of FIG. 3 executes a software algorithm. The software algorithm may take many forms and in an effort to describe the process by way of example, the figures below describe a bitmap and a series of tables to illustrate the process. It is noted however, that the bitmap and tables are only examples of how a software algorithm may be implemented.

Figure 6A:
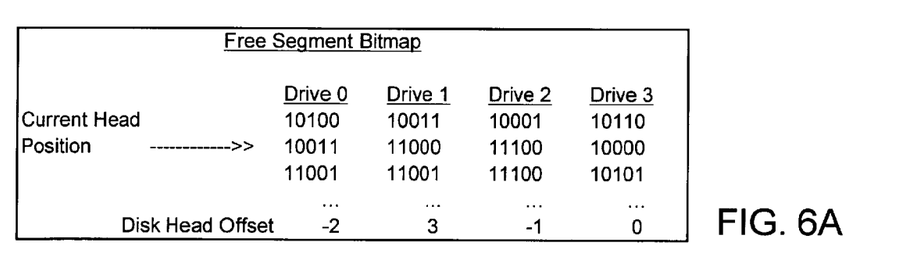
FIG. 6A is a drawing of an embodiment of a free segment bitmap.

Turning now to FIG. 6A, a drawing of an embodiment of a free segment bitmap is shown. In this example, storage controller 401 of FIG. 3 maintains the free segment bitmap. The free segment bitmap shown in FIG. 6A keeps track of all physical segments on all storage devices. The bitmap indicates whether a particular segment contains valid data or not by indicating a one or zero, respectively. For example a zero may indicate a free segment, while a one may indicate that segment contains valid data. If a segment does not contain valid data, then that segment is assumed to be free and new data may be stored in that segment. In the example shown in FIG. 6A, the bitmap is arranged in rows and columns. The columns are divided into columns of separate disk drives. Each disk drive column has columns of ones and zeros representing segments with valid data and free segments on the drives.

To facilitate storing data to free segments that are due to be passing under the heads soon, the bitmap may also indicate the current position of each disk head if the storage devices are hard disk drives. For example, in FIG. 6A, a current head position pointer points to a row in the free segment bitmap. A single row may represent an entire track on a disk and therefore all the segments in that track, or if finer granularity is necessary, a row may represent only a portion of a track with a smaller number of segments. In this example, each row contains five segments. Therefore the current head position pointer has a granularity of five segments. The amount of calculation effort by storage controller 401 of FIG. 3 may increase for finer granularities.

Additionally, if hard disk drives are used that cannot be synchronized to each other and exhibit drifting of the disk rotational speed, the free segment bitmap may maintain a calibration offset value for each drive corresponding to an offset relative to the theoretical position indicated by the current head position pointer. The calibration offset is used to calculate the current head position of each disk head. For example, a calibration offset of 3 on disk head one would indicate that the actual position the disk head is three segments ahead of the position indicated by the current head position pointer. The offset value is recalibrated from time to time due to the drift exhibited by the individual disks in the system. A recalibration is performed by knowing where the last read was performed and knowing the current rotational speed of a drive. Alternatively, to reduce the calculation efforts necessary for maintaining a calibration offset for each disk head, while still allowing non-synchronous disk drive to be used, a current head position pointer may be implemented for each disk head. The free segment bitmap shown in FIG. 6A depicts only the embodiment using a single current disk head pointer and calibration offset values.

As described above, the storage controller 401 of FIG. 3 must keep track of both the location of data and the parity and parity group information corresponding to that data. To facilitate keeping track of the data and parity information, a block remapping technique is implemented in software which maps a logical block address to a physical storage device segment. The block remapping technique includes the use of tables, which are described in detail below. It is noted that, the tables below are only examples of how the software might be implemented and that other variations are possible.

Figure 6B:
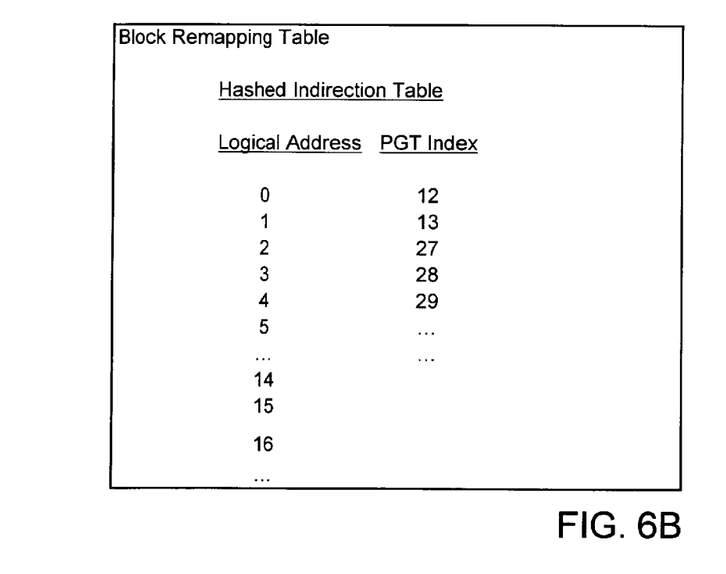
FIG. 6B is a drawing of an embodiment of a hashed indirection table.

FIG. 6B is a drawing of an embodiment of a hashed indirection table (HIT). The HIT maps logical block addresses to an entry or index number in a parity group table shown in FIG. 6C.

Figure 6C:
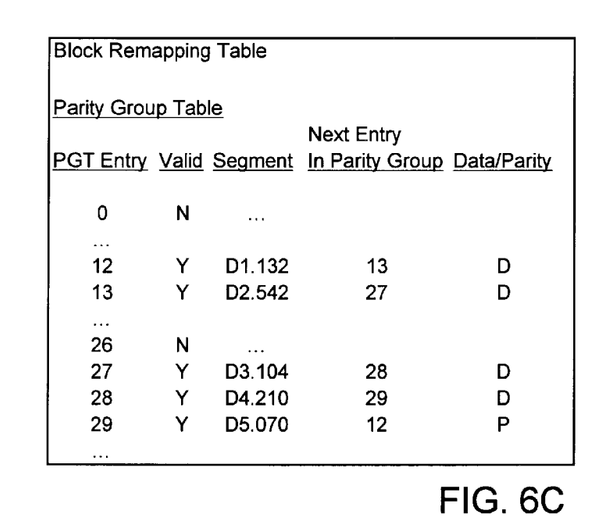
FIG. 6C is a drawing of an embodiment of a parity group table.

FIG. 6C is a drawing of an embodiment of a parity group table. The parity group table (PGT) contains a series of rows referred to as entries. Each row contains several columns which map an entry number to a physical storage device segment. The PGT also links the first physical segment in a parity group to a second physical segment in that parity group, and the second physical segment to the third and so on, until the last physical segment contains the parity data for that parity group. The physical segment that contains the parity data is linked back to the first physical segment in the parity group, thereby creating a circular list for that parity group. The PGT also identifies each segment as valid data, and whether the segment holds data or parity information. Alternatively, an additional table may be used to keep track of the free entries in the PGT which are currently indicated by the valid column in the PGT. This alternative embodiment may allow for more rapid determination of where free entries in the PGT exist.

Referring collectively to FIG. 6B and FIG. 6C, in the HIT, logical address zero maps to entry 12 in the PGT and logical address one maps to entry number 13 in the PGT. In FIG. 6C, entry 12 contains valid data located at physical segment D1.132. This may be interpreted as Disk 1, segment 132. Entry 12 also contains data, not parity information and links physical segment D1.132 to entry number 13 in the PGT. Following the mapping, entry number 13 links to entry number 27, which links to entry number 28, which links to entry number 29 which links back to entry number 12. The information at entry number 29 is different than the others in that the physical segment D5.070 contains parity information for that parity group, as indicated by a P in the data/parity column. The link back to entry number 12 also illustrates the circular nature of the list. As described further below, if data at any of the physical segments is modified, the HIT and is PGT must change to reflect the new mappings.

To preserve the failure tolerance aspect of this system, no two segments belonging to the same parity group may be stored on the same physical device. Therefore, during garbage collection, affinity is given to certain disk drives by the logical blocks being accessed. This affinity helps reduce the overhead of calculating which drives can be used during the garbage collection operations. In other words, each logical block is given a strong affinity to a particular physical disk.

Figure 7A:
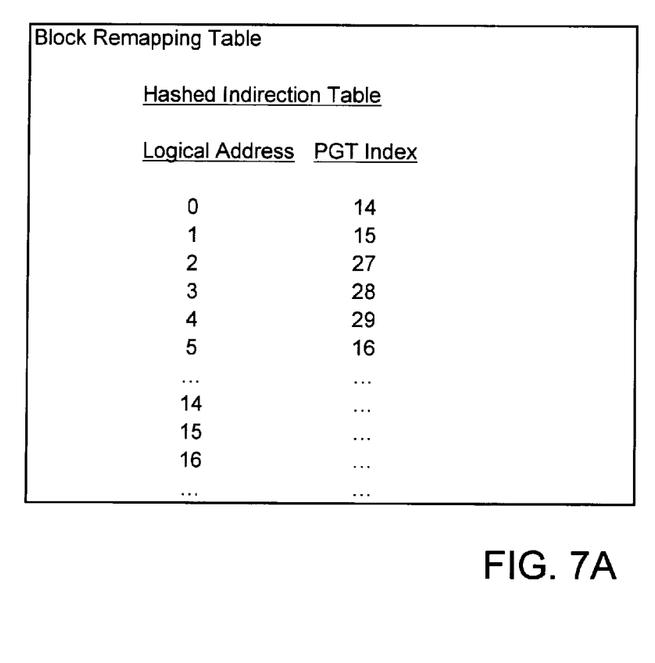
FIG. 7A is a drawing of an embodiment of a modified hashed indirection table of FIG. 6B.
Figure 7B:
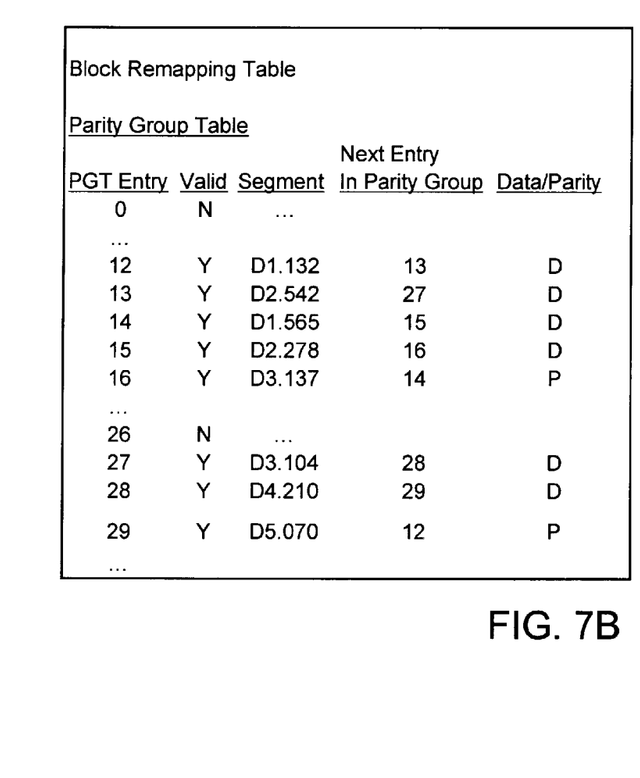
FIG. 7B is a drawing of one embodiment of a modified parity group table of FIG. 6C.

FIG. 7A and FIG. 7B collectively show modified drawings of the hashed indirection table and the parity group table of FIG. 6B and FIG. 6C, respectively. In this example, the HIT and PGT have been modified to reflect modifications to data in physical segments D1.132 and D2.542. These two physical segments are represented in the PGT as entry numbers 12 and 13, respectively. Since we are modifying only two segments out of a parity group that contains four segments we will calculate new parity information only for the new data segments and write the new data and parity to new physical segments D1.565, D2.278 and D3.137. This new parity group contains three blocks and must be accounted for. So referring to FIG. 7A, in the HIT, logical address 0 now maps to entry number 14 in the PGT and logical address two maps to entry number 15 in the PGT. Logical address 5 maps to the new parity information at entry number 16. Note that the PGT has also changed. Referring to FIG. 7B, the PGT now contains valid information at entry numbers 14, 15 and 16. The new parity group is linked together starting at entry number 14. The modified data from entry number 12 is now stored at D1.565, which is linked to entry number 15. The modified data from entry number 13 is now stored at D2.278 and linked to entry number 16. The new parity information is stored at D3.137 and is linked back to entry number 14. The valid fields still show the original data as valid at entry numbers 12 and 13, however that data may be discarded once the remaining unmodified data in the parity group is realigned into a new parity group. In this example, the new data is now protected by the new parity. The old data in entry numbers 12 and 13 is still protected by the original parity in entry number 29, as is the unmodified data in entry numbers 27 and 28. Until the unmodified data in entry numbers 27 and 28 is realigned, the data in entry numbers 12 and 13 must be preserved to protect the data in entry numbers 27 and 28.

Figure 8A:
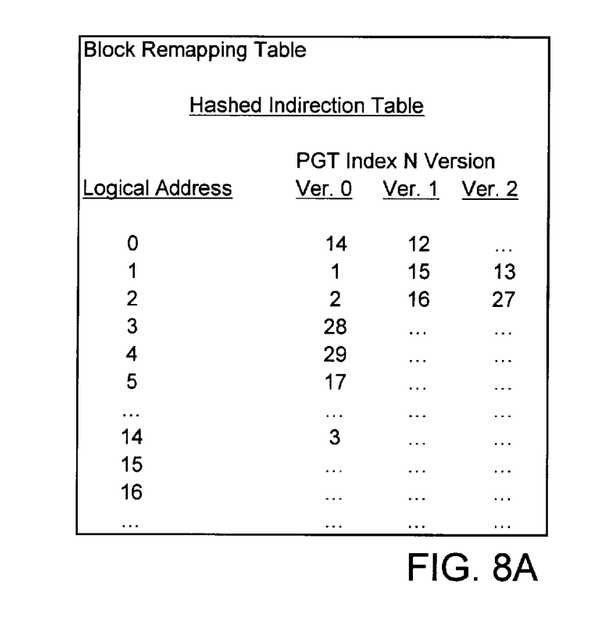
FIG. 8A is a drawing of an embodiment of a hashed indirection table which maintains generational images.

Referring now to FIG. 8A, a drawing of an embodiment of a hashed indirection table (HIT) which maintains generational images. In contrast to the HIT shown in FIG. 6B and in FIG. 7A, the HIT of FIG. 8A has additional columns which correspond to generational images. In this example, the PGT index columns are now labeled version zero through version two, where version zero corresponds to the most current version and version two corresponds to the oldest version. It is noted that although this example is representative of a system which maintains a current version of data and two previous generations of data, in other embodiments more or less versions may be maintained by the system. Additionally, although the example shown in the HIT of FIG. 8A as a table, it is noted that in other embodiments the HIT may be implemented in other ways, such as a linked list or a double linked list, etc. The HIT is intended to be a logical representation of a mechanism for determining a PGT entry from a logical block address. As such, FIG. 8A is a logical representation of a mechanism for determining PGT entries for multiple block generations from a logical block address.

Figure 8B:
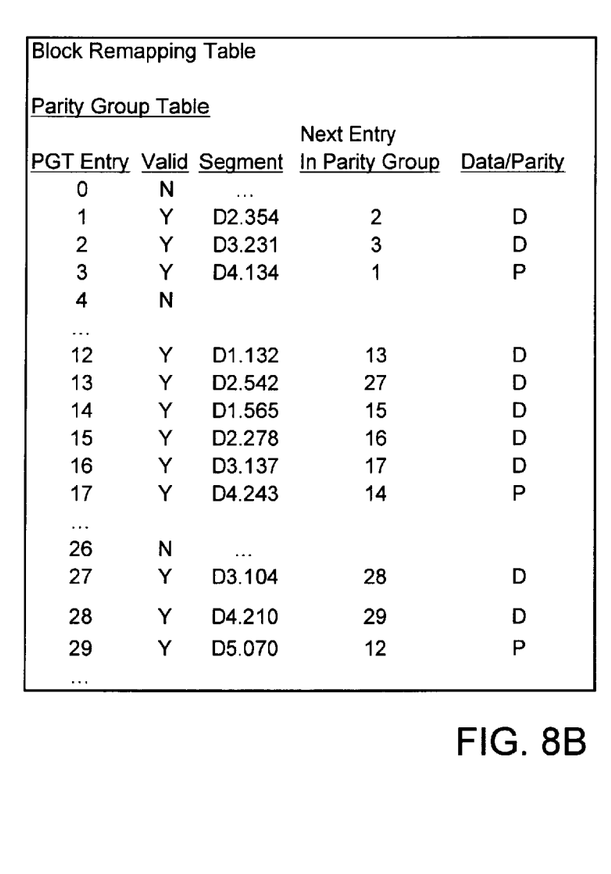
FIG. 8B is a drawing of an embodiment of a modified version of the parity group table of FIG. 7B.

FIG. 8B is a drawing of an embodiment of a modified version of the parity group table (PGT) of FIG. 7B. However, in this example, the PGT of FIG. 8B has additional entries which correspond to modified data and parity.

In order to show an example of maintaining generational images, FIG. 8A and FIG. 8B are referred to collectively. In the HIT, the Ver. 2 column represents the PGT entries of data stored in physical segments which have been modified two times. The Ver. 1 column contains PGT entries which represent data that was modified one time. The Ver. 0 column represents the most current version of the entries in the PGT of FIG. 8B. Therefore, the HIT is used in the following way; if the most recent version of logical block one was requested, then PGT entry number 14 would be accessed. If the next older version was requested, PGT entry number 12 would be accessed. Similarly, if the oldest version of logical block 2 was requested, PGT entry number 27 would be accessed. In the Ver. 0 column, logical blocks one, three and four were modified during a last modification. Therefore, as the HIT entries indicate, the PGT entries one, two and three were also modified. In the PGT, entry number one contains valid data in physical segment D2.354 and links to entry number 2. Entry number two contains valid data in physical segment D3.231 and links to entry number three. Entry number three also contains valid data in physical segment D4.134 and links back to entry number one. Entry number three is also the parity information for the new parity group formed by entry number one and entry number two as indicated by the P in the data/parity column.

If the data in logical blocks one or two in the HIT were to be modified again, the PGT entry numbers 13 and 27 would drop out of the HIT. Correspondingly, the physical segments D2.542 and D3.104 may be reclaimed as free segments during the next garbage collection operation.

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as network and/or a wireless link.

Numerous variations and modifications will become apparent to those skilled in the art once the above disclosure is fully appreciated. It is intended that the following claims be interpreted to embrace all such variations and modifications.

What is claimed is:

1. A data storage subsystem, comprising:
   a plurality of storage devices configured in an array; and
   a storage controller coupled to said plurality of storage devices, wherein said storage controller is configured to store a first stripe of data as a first plurality of data stripe units across ones of said plurality of storage devices;
   wherein said first plurality of data stripe units includes a first plurality of data blocks and a first parity block which is calculated for said first plurality of data blocks;
   wherein, in response to a data modification operation, said storage controller is configured to receive a write transaction modifying a second stripe of data, and to store only said second stripe of data as a second plurality of data stripe units to new locations across said ones of said plurality of storage devices,
   wherein said second plurality of data stripe units includes a second plurality of data blocks, which is a subset of said first plurality of data blocks, and a second parity block which is calculated for said second plurality of data blocks.

2. The data storage subsystem as recited in claim 1, wherein said storage controller is further configured to compute said second parity block for said second plurality of data blocks, which is a modified subset of said first plurality of data blocks, and to store said second plurality of data blocks and said second parity block to a plurality of new locations.

3. The data storage subsystem as recited in claim 2, wherein each one of said plurality of storage devices includes a disk head unit configured for reading and writing data, and wherein said storage controller is further configured to select which ones of said plurality of new locations is closest in proximity to said disk head unit.

4. The data storage subsystem as recited in claim 1, wherein said storage controller is further configured to maintain a free segment bitmap comprising:
   a listing of segments located on each one of said plurality of storage devices;
   an indication of whether each of said segments contains active data, or no data; and
   a current disk head position pointer configured to indicate the current position of a disk head unit on each one of said plurality of storage devices.

5. The data storage subsystem as recited in claim 4, wherein said storage controller is further configured to calculate a disk head offset value for each one of said plurality of storage devices, wherein said disk head offset value represents a positive or negative offset from a theoretical position indicated by said current disk head position pointer in said free segment bitmap.

6. The data storage subsystem as recited in claim 4, wherein said storage controller is further configured to maintain a block remapping table which maps a logical address for a data block to a first physical segment on one of said plurality of storage devices.

7. The data storage subsystem as recited in claim 6, wherein said block remapping table further maps said first physical segment in a first parity group to a second physical segment which belongs to said first parity group and is stored on another one of said plurality of storage devices.

8. The data storage subsystem as recited in claim 7, wherein said storage controller is further configured to remap a plurality of parity groups by:
   collecting a plurality of existing parity groups each one of which comprises a non-default number of data blocks stored across said storage devices;
   forming a plurality of new parity groups from said plurality of existing parity groups, wherein each one of said plurality of new parity groups comprises a default number of data blocks;
   calculating a plurality of new parity blocks for each one of said new parity groups; and
   storing each one of said plurality of new parity groups and said new parity blocks.

9. The data storage subsystem as recited in claim 8, wherein said storage controller is further configured to maintain a plurality of versions of said plurality of existing parity groups which existed prior to a modification of ones of said data blocks in said plurality of existing parity groups.

10. A method for storing data in a data storage subsystem including a plurality of storage devices configured in an array and a storage controller coupled to said plurality of storage devices, said method comprising:
   storing a first tripe of data as a first plurality of data stripe units across ones of a plurality of storage devices,
   wherein said first plurality of data stripe units includes a first plurality of data blocks and a first parity block which is calculated for said first plurality of data blocks; and in response to a data modification operation, receiving a write transaction modifying a second stripe of data, and storing only said second stripe of data as a second plurality of data stripe units to new locations across said ones of said plurality of storage devices;

wherein said second plurality of data stripe units includes a second plurality of data blocks, which is a subset of said first plurality of data blocks, and a second parity block which is calculated for said second plurality of data blocks.

11. The method as recited in claim 10, wherein said method further comprises computing said second parity block for said second plurality of data blocks, which is a modified subset of said first plurality of data blocks, and to store said second plurality of data blocks and said second parity block to a plurality of new locations.

12. The method as recited in claim 11, wherein each one of said plurality of storage devices includes a disk head unit configured for reading and writing data, and wherein said method further comprises selecting which ones of said plurality of new locations is closest in proximity to said disk head unit.

13. The method as recited in claim 12, wherein said method further comprises maintaining a free segment bitmap comprising:

a listing of segments located on each one of said plurality of storage devices;

an indication of whether each of said segments contains active data, or no data; and a current disk head position pointer configured to indicate the current position of said disk head unit on each one of said plurality of storage devices.

14. The method as recited in claim 13, wherein said method further comprises calculating a disk head offset value for each one of said plurality of storage devices, wherein said disk head offset value represents a positive or negative offset from a theoretical position indicated by said current disk head position pointer in said free segment bitmap.

15. The method as recited in claim 14, wherein said method further comprises maintaining a block remapping table which maps a logical address of a data block to a first physical segment on one of said plurality of storage devices.

16. The method as recited in claim 14, wherein said method further comprises said block remapping table further mapping said first physical segment in a first parity group to a second physical segment which belongs to said first parity group and is stored on another one of said plurality of storage devices.

17. The method as recited in claim 14, wherein said method further comprises remapping a plurality of parity groups by:

collecting a plurality of existing parity groups each one of which comprises a non-default number of data blocks stored across said storage devices;

forming a plurality of new parity groups from said plurality of existing parity groups, wherein each one of said plurality of new parity groups comprises a default number of data blocks;

calculating a plurality of new parity blocks for each one of said new parity groups;

storing each one of said plurality of new parity groups and said new parity blocks.

18. The method as recited in claim 14, wherein said method further comprises maintaining a plurality of versions of said plurality of existing parity groups which existed prior to a modification of ones of said data blocks in said plurality of existing parity groups.

19. A computer system, comprising:

a processor, a bus bridge unit coupled to said processor, a memory coupled to said bus bridge unit; and a data storage subsystem coupled to said bus bridge unit, the data storage subsystem including:

a plurality of storage devices configured in an array; and a storage controller coupled to said plurality of storage devices, wherein said storage controller is configured to store a first strip of data as a first plurality of data stripe units across ones of said plurality of storage devices;

wherein said first plurality of data stripe unites includes a first plurality of data blocks and a first parity block which is calculated for said first plurality of data blocks;

wherein, in response to a data modification operation, said storage controller is configured to receive a write transaction modifying a second stripe of data and to store only said second stripe of data as a second plurality of data stripe units to new locations across said ones of said plurality of storage devices; and wherein said second plurality of data stripe units includes a second plurality of data blocks, which is a subset of said first plurality of data blocks, and a second parity block which is calculated for said second plurality of data blocks.

20. The computer system as recited in claim 19, wherein said storage controller is further configured to compute said second parity block for said second plurality of data blocks, which is a modified subset of said first plurality of data blocks, and to store said second plurality of data blocks and said second parity block to a plurality of new locations.

21. The computer system as recited in claim 20, wherein each one of said plurality of storage devices includes a disk head unit configured for reading and writing data, and wherein said storage controller is further configured to select which ones of said plurality of new locations is closest in proximity to said disk head unit.

22. The computer system as recited in claim 19, wherein said storage controller is further configured to maintain a free segment bitmap comprising:

a listing of segments located on each one of said plurality of storage devices;

an indication of whether each of said segments contains active data, or no data; and a current disk head position pointer configured to indicate the current position of a disk head unit on each one of said plurality of storage devices.

23. The computer system as recited in claim 22, wherein said storage controller is further configured to calculate a disk head offset value for each one of said plurality of storage devices, wherein said disk head offset value represents a positive or negative offset from a theoretical position indicated by said current disk head position pointer in said free segment bitmap.

24. The computer system as recited in claim 22, wherein said storage controller is further configured to maintain a block remapping table which maps a logical address of a data block to a first physical segment on one of said plurality of storage devices.

25. The computer system as recited in claim 24, wherein said block remapping table further maps said first physical segment in a first parity group to a second physical segment which belongs to said first parity group and is stored on another one of said plurality of storage devices.

26. The computer system as recited in claim 25, wherein said storage controller is further configured to remap a plurality of parity groups by:
    collecting a plurality of existing parity groups each one of which comprises a non-default number of data blocks stored across said storage devices;
    forming a plurality of new parity groups from said plurality of existing parity groups, wherein each one of said plurality of new parity groups comprises a default number of data blocks;
    calculating a plurality of new parity blocks for each one of said new parity groups;
    storing each one of said plurality of new parity groups and said new parity blocks.

27. The computer system as recited in claim 26, wherein said storage controller is further configured to maintain a plurality of versions of said plurality of existing parity groups which existed prior to a modification of ones of said data blocks in said plurality of existing parity groups.

28. A data storage subsystem comprising:
    a plurality of storage devices configured in an array; and
    a storage controller coupled to said plurality of storage devices, wherein said storage controller is configured to store a first stripe of data as a first plurality of data stripe units across ones of said plurality of storage devices;
    wherein said first plurality of data stripe units includes a first plurality of data blocks and a first parity block which is calculated for said first plurality of data blocks;
    wherein said storage controller is configured to receive a write transaction modifying a subset of said first plurality of data blocks;
    wherein said storage controller is configured to calculate a new parity block for said subset of said first plurality of data blocks;
    wherein said storage controller is configured to only store said subset of said first plurality of data blocks modified by the write transaction and said new parity block as a new parity group to new locations across ones of said plurality of storage devices.

29. The data storage subsystem as recited in claim 28, wherein each one of said plurality of storage devices includes a disk head unit configured for reading and writing data, and wherein said storage controller is further configured to select ones of a plurality of new locations closest in proximity to said disk head unit.

30. The data storage subsystem as recited in claim 28, wherein said storage controller is further configured to store a second stripe of data as a second plurality of data stripe units across said ones of said plurality of storage devices, wherein said second plurality of data stripe units includes a second plurality of data blocks, which is different in number than said first plurality of data blocks, and a second parity block which is calculated for said second plurality of data blocks.

31. The data storage subsystem as recited in claim 28, wherein said storage controller is further configured to remap a plurality of parity groups by:
    collecting a plurality of existing parity groups each one of which comprises a non-default number of data blocks stored across said storage devices;
    forming a plurality of new parity groups from said plurality of existing parity groups, wherein each one of said plurality of new parity groups comprises a default number of data blocks;
    calculating a plurality of new parity blocks for each one of said new parity groups;
    and
    storing each one of said plurality of new parity groups and said new parity blocks to new locations across ones of said plurality of storage devices.

32. The data storage subsystem as recited in claim 31, wherein said storage controller is further configured to maintain a plurality of versions of said plurality of existing parity groups which existed prior to a modification of ones of said data blocks in said plurality of existing parity groups.

33. A method for storing data in a data storage subsystem including a plurality of storage devices configured in an array and a storage controller coupled to said plurality of storage devices, said method comprising:
    storing a first stripe of data as a first plurality of data stripe units across ones of a plurality of storage devices;
    wherein said first plurality of data stripe units includes a first plurality of data blocks and a first parity block which is calculated for said first plurality of data blocks;
    receiving a write transaction modifying a subset of said first plurality of data blocks;
    calculating a new parity block for said subset of said first plurality of data blocks; and
    storing only said subset of said first plurality of data blocks modified by the write transaction and said new parity block as a new parity group to new locations across ones of said plurality of storage devices.

34. The method as recited in claim 33, wherein each one of said plurality of storage devices includes a disk head unit configured for reading and writing data, and wherein said method further comprises selecting which ones of said plurality of new locations is closest in proximity to said disk head unit.

35. The method as recited in claim 34, wherein said method further comprises storing a second stripe of data as a second plurality of data stripe units across said ones of said plurality of storage devices, wherein said second plurality of data stripe units includes a second plurality of data blocks, which is different in number than said first plurality of data blocks, and a second parity block which is calculated for said second plurality of data blocks.

36. The method as recited in claim 35, wherein said method further comprises remapping a plurality of parity groups by:
    collecting a plurality of existing parity groups each one of which comprises a non-default number of data blocks stored across said storage devices;
    forming a plurality of new parity groups from said plurality of existing parity groups, wherein each one of said plurality of new parity groups comprises a default number of data blocks;
    calculating a plurality of new parity blocks for each one of said new parity groups; and
    storing each one of said plurality of new parity groups and said new parity blocks to new locations across ones of said plurality of storage devices.

37. The method as recited in claim 35, wherein said method further comprises maintaining a plurality of versions of said plurality of existing parity groups which existed prior to a modification of ones of said data blocks in said plurality of existing parity groups.

38. A computer system comprising:

a processor;

a bus bridge unit coupled to said processor;

a memory coupled to said bus bridge unit; and a data storage subsystem coupled to said bus bridge unit, the data storage subsystem including:

a plurality of storage devices configured in an array; and a storage controller coupled to said plurality of storage devices, wherein said storage controller is configured to store a first stripe of data as a first plurality of data stripe units across ones of said plurality of storage devices, wherein said first plurality of data stripe units includes a first plurality of data blocks and a first parity block which is calculated for said first plurality of data blocks; and wherein said storage controller is configured to receive a write transaction modifying a subset of said first plurality of data blocks;

wherein said storage controller is configured to calculate a new parity block for said subset of said first plurality of data blocks;

wherein said storage controller is configured to only store said subset of said first plurality of data blocks modified by the write transaction and said new parity block as a new parity group to new locations across ones of said plurality of storage devices.

39. The computer system as recited in claim 38, wherein each one of said plurality of storage devices includes a disk head unit configured for reading and writing data, and wherein said storage controller is further configured to select ones of a plurality of new locations closest in proximity to said disk head unit.

40. The computer system as recited in claim 39, wherein said storage controller is further configured to store a second stripe of data as a second plurality of data stripe units across said ones of said plurality of storage devices, wherein said second plurality of data stripe units includes a second plurality of data blocks, which is different in number than said first plurality of data blocks, and a second parity block which is calculated for said second plurality of data blocks.

41. The computer system as recited in claim 40, wherein said storage controller is further configured to remap a plurality of parity groups by:

collecting a plurality of existing parity groups each one of which comprises a non-default number of data blocks stored across said storage devices;

forming a plurality of new parity groups from said plurality of existing parity groups, wherein each one of said plurality of new parity groups comprises a default number of data blocks;

calculating a plurality of new parity blocks for each one of said new parity groups; and storing each one of said plurality of new parity groups and said new parity blocks to new locations across ones of said plurality of storage devices.

42. The computer system as recited in claim 41, wherein said storage controller is further configured to maintain a plurality of versions of said plurality of existing parity groups which existed prior to a modification of ones of said data blocks in said plurality of existing parity groups.

* * * * *

UNITED STATES PATENT AND TRADEMARK OFFICE
CERTIFICATE OF CORRECTION

PATENT NO. : 6,745,284 B1
DATED : June 1, 2004
INVENTOR(S) : Whay S. Lee and Randall D. Rettberg It is certified that error appears in the above-identified patent and that said Letters Patent is hereby corrected as shown below:

<u>Column 12,</u>
Line 13, please delete "strip" and insert -- stripe -- in place thereof.
Line 16, please delete "unites" and insert -- units -- in place thereof.

Signed and Sealed this

Fourteenth Day of September, 2004

JON W. DUDAS
*Director of the United States Patent and Trademark Office*